US010785509B2

(12) United States Patent
Souche et al.

(10) Patent No.: US 10,785,509 B2
(45) Date of Patent: Sep. 22, 2020

(54) HEAT RANKING OF MEDIA OBJECTS

(71) Applicant: ACCENTURE GLOBAL SOLUTIONS LIMITED, Dublin (IE)

(72) Inventors: Christian Souche, Cannes (FR); Chongmo Liu, Juan les Pins (FR); Edouard Mathon, Antibes (FR)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 147 days.

(21) Appl. No.: 15/962,646

(22) Filed: Apr. 25, 2018

(65) Prior Publication Data
US 2018/0307690 A1    Oct. 25, 2018

(30) Foreign Application Priority Data

Apr. 25, 2017  (FR) .................................. 17 168066
Apr. 25, 2017  (FR) .................................. 17 168069
Jun. 14, 2017  (FR) .................................. 17 176137

(51) Int. Cl.
*G06K 9/00*    (2006.01)
*H04N 21/234*  (2011.01)
(Continued)

(52) U.S. Cl.
CPC . *H04N 21/23424* (2013.01); *G06F 16/24578* (2019.01); *G06F 16/583* (2019.01);
(Continued)

(58) Field of Classification Search
CPC ........... H04N 21/23424; H04N 21/812; H04N 21/44008; H04N 21/23418;
(Continued)

(56) References Cited

U.S. PATENT DOCUMENTS

| 5,808,695 A | 9/1998 | Rosser et al. |
| 5,892,554 A | 4/1999 | DiCicco et al. |

(Continued)

FOREIGN PATENT DOCUMENTS

| CN | 105872602 | 8/2016 |
| WO | 2015/047246 | 4/2015 |

OTHER PUBLICATIONS

Fanman et al., "From Logo to Object Segmentation", IEEE Transactions on Multimedia, vol. 15, No. 8, pp. 2186-2197. 2013.

(Continued)

*Primary Examiner* — Van D Huynh
(74) *Attorney, Agent, or Firm* — Mannava & Kang, P.C.

(57) ABSTRACT

A heat map creation engine receives a series of image frames from amongst a plurality of image frames of a media, where the series of image frames includes a target frame and at least one neighboring frame. The heat map creation engine also extracts spatial-temporal features of the image frames, rescales the spatial-temporal features to obtain heat distribution over the target frame, and creates a heat map for the target frame based on the heat distribution. A semantic segmentation engine segments the image frames into multiple media objects based on pre-defined classes, and selects one or more media objects from amongst the media objects based on pre-defined conditions. A heat ranking engine ranks the selected one or more media objects in the media based on the heat scores and the created heat map.

19 Claims, 6 Drawing Sheets

(51) Int. Cl.

| | | |
|---|---|---|
| G06Q 30/02 | (2012.01) | |
| G06T 15/20 | (2011.01) | |
| G06T 11/60 | (2006.01) | |
| G06T 7/73 | (2017.01) | |
| G06F 16/583 | (2019.01) | |
| G06F 16/2457 | (2019.01) | |
| G11B 27/00 | (2006.01) | |
| H04N 21/258 | (2011.01) | |
| H04N 21/2668 | (2011.01) | |
| H04N 21/44 | (2011.01) | |
| H04N 21/472 | (2011.01) | |
| H04N 21/81 | (2011.01) | |
| G06T 7/10 | (2017.01) | |
| G06T 19/20 | (2011.01) | |
| G06F 3/01 | (2006.01) | |

(52) U.S. Cl.
CPC ......... *G06Q 30/02* (2013.01); *G06Q 30/0241* (2013.01); *G06Q 30/0277* (2013.01); *G06T 7/10* (2017.01); *G06T 7/75* (2017.01); *G06T 11/60* (2013.01); *G06T 15/205* (2013.01); *G06T 19/20* (2013.01); *G11B 27/00* (2013.01); *H04N 21/23412* (2013.01); *H04N 21/23418* (2013.01); *H04N 21/25825* (2013.01); *H04N 21/2668* (2013.01); *H04N 21/44008* (2013.01); *H04N 21/47205* (2013.01); *H04N 21/812* (2013.01); *H04N 21/8146* (2013.01); *G06F 3/013* (2013.01)

(58) Field of Classification Search
CPC ............ G06Q 30/0241; G06Q 30/0277; G06F 16/24578; G06T 7/10; G06T 7/75
USPC ....................................................... 382/100
See application file for complete search history.

(56) References Cited

U.S. PATENT DOCUMENTS

| | | | |
|---|---|---|---|
| 6,100,925 | A | 8/2000 | Rosser et al. |
| 7,908,172 | B2 | 3/2011 | Corts et al. |
| 8,910,201 | B1 | 12/2014 | Zamiska et al. |
| 9,424,494 | B1* | 8/2016 | Lineback ............. G06K 9/6267 |
| 10,299,008 | B1 | 5/2019 | Catalano |
| 10,623,789 | B1 | 4/2020 | Spracklen |
| 2002/0078446 | A1 | 6/2002 | Dakss et al. |
| 2002/0144262 | A1 | 10/2002 | Plotnick et al. |
| 2005/0188012 | A1 | 8/2005 | Dideriksen |
| 2007/0100698 | A1 | 5/2007 | Neiman et al. |
| 2007/0162952 | A1 | 7/2007 | Steinborn |
| 2007/0192782 | A1 | 8/2007 | Ramaswamy |
| 2008/0046499 | A1 | 2/2008 | Cabrera et al. |
| 2008/0101456 | A1 | 5/2008 | Ridge et al. |
| 2008/0184288 | A1 | 7/2008 | Lipscomb |
| 2008/0249986 | A1 | 10/2008 | Clarke-Martin |
| 2009/0019487 | A1 | 1/2009 | Kulas |
| 2009/0092374 | A1 | 4/2009 | Kulas |
| 2010/0064025 | A1 | 3/2010 | Nelimarkka et al. |
| 2010/0154007 | A1 | 6/2010 | Touboul et al. |
| 2011/0177775 | A1 | 7/2011 | Gupta et al. |
| 2012/0253937 | A1 | 10/2012 | Wing et al. |
| 2013/0083859 | A1 | 4/2013 | Nemiroff |
| 2013/0091519 | A1 | 4/2013 | McLauchlan et al. |
| 2013/0304604 | A1 | 11/2013 | Hoffman et al. |
| 2014/0140680 | A1 | 5/2014 | Jo |
| 2014/0259056 | A1 | 9/2014 | Grusd |
| 2014/0282724 | A1 | 9/2014 | Chalozin et al. |
| 2015/0138238 | A1 | 5/2015 | Wagg |
| 2015/0264416 | A1 | 9/2015 | Heinz et al. |
| 2015/0339838 | A1 | 11/2015 | Friedman et al. |
| 2015/0363635 | A1* | 12/2015 | Suri ........................ G11B 27/28 386/241 |
| 2016/0034786 | A1* | 2/2016 | Suri ..................... G06K 9/6256 382/159 |
| 2016/0212455 | A1* | 7/2016 | Manna ............. H04N 21/23424 |
| 2017/0062009 | A1 | 3/2017 | Clifton et al. |
| 2018/0218727 | A1 | 8/2018 | Cutler |
| 2019/0122698 | A1 | 4/2019 | Iyer |
| 2019/0220652 | A1* | 7/2019 | Li ........................ G06N 3/0454 |

OTHER PUBLICATIONS

Kang Kai et al., "Object Detection from Video Tubelets with Convolutional Neural Networks", 2016 IEEE Conference on Computer Vision and Pattern Recognition (CVPR), IEEE, Jun. 27, 2016, pp. 817-825.

Wenguan Wang et al., "A Unified Spatiotemporal Prior based on Geodesic Distance for Video Object Segmentation", IEEE Transactions on Pattern Analysis and Machine Intelligence, Jan. 31, 2017, pp. 1-18.

Kruthiventi Srinivas SS et al., "Saliency Unified: A Deep Architecture for simultaneous Eye Fixation Prefiction and Salient Object Segmentation", 2016 IEEE Conference on Computer Vision and Pattern Recognition (CVPR), IEEE, Jun. 27, 2016, pp. 5781-5790.

Lipton AJ et al., "Moving target classification and tracking from real-time video", Applications of Computer Vision, 1998. WACV '98. Proceedings., Fourth IEEE Workshop on Princeton, NJ. USA. Oct. 19, 1998, pp. 8-14.

Chinese Patent Office, "Notification of the First Office Action, CN application No. 2018103757384", dated Jun. 11, 2020, 18 pages.

* cited by examiner

600

```
┌─────────────────────────────────────────────────────────────────────┐
│ Receiving a series of image frames from amongst a plurality of      │
│ image frames of a media, the series of image frames including a     │
│ target frame and at least one neighboring frame                     │
│ 602                                                                 │
└─────────────────────────────────────────────────────────────────────┘
                                  ↓
┌─────────────────────────────────────────────────────────────────────┐
│ Extracting spatial-temporal features of the image frames            │
│ 604                                                                 │
└─────────────────────────────────────────────────────────────────────┘
                                  ↓
┌─────────────────────────────────────────────────────────────────────┐
│ Rescaling the spatial-temporal features to obtain a heat            │
│ distribution over the target frame                                  │
│ 606                                                                 │
└─────────────────────────────────────────────────────────────────────┘
                                  ↓
┌─────────────────────────────────────────────────────────────────────┐
│ Creating a heat map for the target frame based on the heat          │
│ distribution over the target frame                                  │
│ 608                                                                 │
└─────────────────────────────────────────────────────────────────────┘
                                  ↓
┌─────────────────────────────────────────────────────────────────────┐
│ Segmenting the image frames of the media comprising the plurality   │
│ of image frames into multiple media objects based on pre-defined    │
│ classes                                                             │
│ 610                                                                 │
└─────────────────────────────────────────────────────────────────────┘
                                  ↓
┌─────────────────────────────────────────────────────────────────────┐
│ Selecting one or more media objects from amongst the media          │
│ objects based on pre-defined conditions                             │
│ 612                                                                 │
└─────────────────────────────────────────────────────────────────────┘
                                  ↓
┌─────────────────────────────────────────────────────────────────────┐
│ Detecting image frames comprising the selected one or more media    │
│ objects based on camera angle changes                               │
│ 614                                                                 │
└─────────────────────────────────────────────────────────────────────┘
                                  ↓
┌─────────────────────────────────────────────────────────────────────┐
│ Determining heat scores for the selected one or more media objects  │
│ 616                                                                 │
└─────────────────────────────────────────────────────────────────────┘
                                  ↓
┌─────────────────────────────────────────────────────────────────────┐
│ Ranking the selected one or more media objects in the media based   │
│ on the heat scores and the created heat map                         │
│ 618                                                                 │
└─────────────────────────────────────────────────────────────────────┘
```

Figure 6

HEAT RANKING OF MEDIA OBJECTS

PRIORITY CLAIM

This application claims priority to European Patent application number 17168069.7 titled Dynamic Content Placement in Media and European Patent application number 17168066.3 titled Dynamic Content Rendering in Media both of which were filed on Apr. 25, 2017. This application also claims priority to European Patent application number 17176137.2 titled Hear Ranking of Media Objects filed on Jun. 14, 2017.

BACKGROUND

The widespread use of the Internet by people for business and personal purposes has turned out to be an opportunity for marketers to promote their brands, products, and services over this medium. The marketers use various marketing strategies to reach out to people. One such marketing strategy is digital media advertising. Digital media advertising involves advertisement of products and services while streaming media to viewers. A media may be, but is not limited to, a video or a still image. In an example, for advertising products, corresponding content such as brand logos may be placed in the media and then the media is rendered to the viewers. The marketers use digital media advertising to attract, engage, and convert viewers into customers. However, grabbing the attention of the viewers and getting them interested in advertisements remains a challenge for marketers.

Various techniques have been developed to help marketers gain insights about viewers' attention to a media, i.e., what viewers are looking at in the media or what draws their attention and for how long. In an example, based on the insights, a marketer can identify effective positions in the media for placement of content or the marketer is able to evaluate the performance of the previously inserted content to determine whether the content is able to grab the attention of the viewers after the media comprising the content is rendered to the viewers.

One such technique is an eye tracking-based heat map technique that involves a wearable eye-tracking device for tracking viewers' eye positions and movements when watching a media. Subsequently, a visual heat map is created based on the tracked eye positions and movements. The heat map highlights an area or regions in the media that grabbed maximum viewer attention. A marketer may manually examine the heat map to make interpretations. In an example, the marketer may manually identify hotspots, i.e., areas of maximum interest to the viewers for effective placement of content in the media. Such a technique however, suffers from numerous drawbacks. For example, the collection of viewers' eye positions and movements is a time-consuming process, thereby leading to a slow response time. Further, the technique is cost intensive as it involves a specialist device, i.e., the wearable eye tracking device. Also, since the heat map is manually examined by the marketer to identify the hotspots, the whole process is time intensive and error prone.

Another technique is an algorithmic-based heatmap technique that involves prediction of eye positions of the viewers when watching a media, based on artificial intelligence. The technique further involves creation of a visual heat map based on the eye positions of the viewers. A marketer may then manually examine the heat map for making interpretations. However, because such a technique captures only static features when dealing with videos, there is limited accuracy of data that is reflected by the heat map. Thus, the currently available techniques of digital media advertising may be time-intensive, cost-intensive, unreliable, and inaccurate.

BRIEF DESCRIPTION OF DRAWINGS

Features of the present disclosure are illustrated by way of examples shown in the following figures. In the following figures, like numerals indicate like elements, in which:

FIG. 6 illustrates a computer-implemented method depicting functionality of the system, according to an example embodiment of the present disclosure;

DETAILED DESCRIPTION

Figure 1:
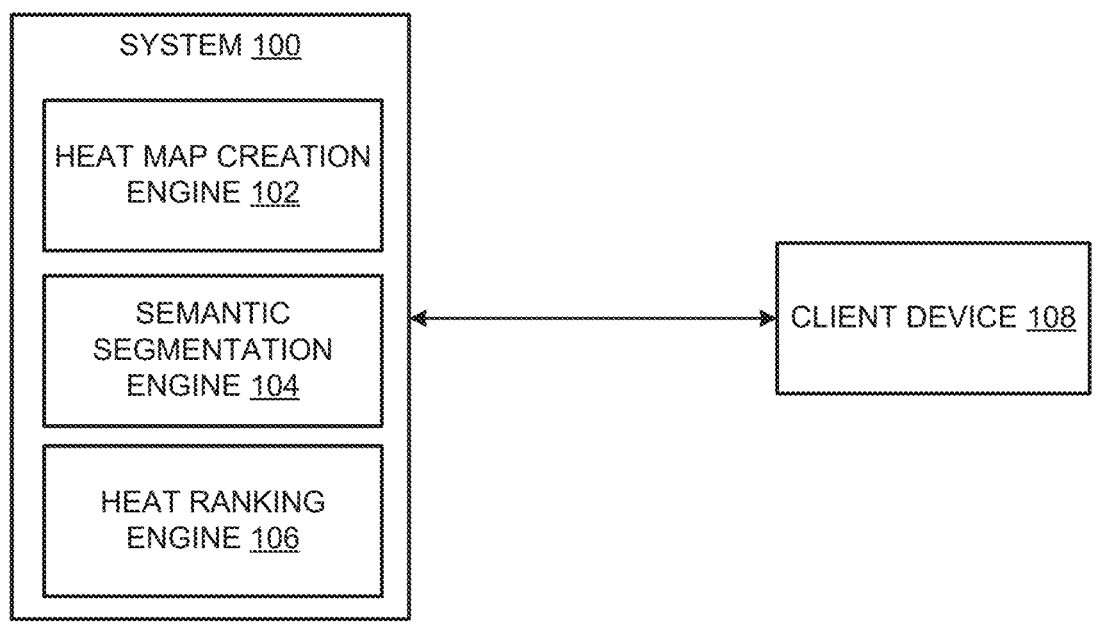
FIG. 1 illustrates a block diagram of a system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on.

The present subject matter describes systems and methods for creation of heat maps for a media and heat ranking of media objects in the media based on the heat maps created for the media. In an example, the media may be a video. Further, in an example, based on the heat ranking of the media objects, content, such as an advertisement may be placed in the media and the media may then be rendered to viewers. In another example, based on the heat ranking of the media objects, performance of the content may be evaluated to determine whether the content is able to grab attention of the viewers after the media comprising the content is rendered to the viewers. In an example, the content may be indicative of one or more of a text, an image, and multimedia content.

In an example embodiment of the present disclosure, the system may include a heat map creation engine, a semantic segmentation engine, and a heat ranking engine. In an example embodiment, the heat map creation engine, the semantic segmentation engine, and the heat ranking engine may be in communication with each other to perform the functionalities of the system.

Further, in an example embodiment, the system may be communicatively coupled to a client device through one or more communication links, such that a user of the client device can access the system. In an example, the user may be an administrator of the client device. In another example, the user may be a person who is well versed in the art of media editing or marketing or graphic designing, such as a marketer.

For the purpose of creation of heat maps for a media and heat ranking of media objects in the media based on created heat maps, the heat map creation engine of the system of the present subject matter may receive a series of image frames from amongst a plurality of image frames of the media. In an example, the series of image frames may include a target frame and at least one neighboring frame. The target frame may be understood as an image frame for which a heat map is to be created.

Upon receiving the series of image frames, the heat map creation engine may extract spatial-temporal features of the image frames. In an example, the spatial-temporal features of the image frames include one or more spatial features and one or more temporal features of the image frames. In said example, the spatial features of the image frames may include one or more of color features, texture features, shape features, and size features, and the temporal features of the image frames may include one or more of motion features, trajectory features, and flicker features.

Subsequently, the heat map creation engine may rescale the spatial-temporal features to obtain a heat distribution over the target frame. Based on the heat distribution over the target frame, the heat map creation engine may create a heat map for the target frame. The heat map may highlights areas of maximum interest to viewers in the target frame.

In an example embodiment of the present disclosure, the semantic segmentation engine may receive the media comprising the plurality of image frames. The semantic segmentation engine may then segment the image frames into multiple media objects based on pre-defined classes. Subsequently, the semantic segmentation engine may select one or more media objects from amongst the media objects based on pre-defined conditions. In an example, the pre-defined conditions may include conditions that are related to an area and a shape of the media objects.

Further, according to an example embodiment, the heat ranking engine of the system may include a detection unit to receive the heat map created for the target frame. The detection unit may further detect image frames comprising the selected one or more media objects. According to an example embodiment, the image frames comprising the selected one or more media objects may be detected based on camera angle changes.

The heat ranking engine may further include a ranking unit to determine heat scores for the selected one or more media objects. In one example, a heat score for a media object may be determined based on a number of image frames comprising the selected one or more media objects, a total number of image frames in the media, heat data of the media object at pixel level, and a total number of pixels in the media object. In another example, the heat score for the media object may be determined based on a number of image frames comprising the selected one or more media objects, a total number of image frames in the media, heat data of the media object at pixel level, and a total number of pixels in the image frames comprising the selected one or more media objects.

Thereafter, the ranking unit may rank the selected one or more media objects in the media based on the heat scores and the created heat map. In an example, a media object with a highest rank is an object of maximum visual interest to a viewer and a media object with a lowest rank is an object with minimum visual interest to the viewer. A rank given to a media object may also be referred to as heat rank as the rank is given based on the heat map.

Further, although the discussion above pertains to a heat map creation engine creating a heat map for one target frame, i.e. image frame, in an implementation, the heat map creation engine may create heat maps for all the image frames in the media in a similar manner as described above. Additionally, the ranking unit may rank the selected one or more media objects in the media based on all the heat maps created for the media.

The ranking unit may then provide information indicative of the heat ranks of the media objects to a client device for placement of content in the media. The content may be indicative of one or more of a text, an image, and multimedia content.

The system of the present disclosure may offer time-effective and accurate creation of heat maps as the heat maps are created based on both spatial and temporal features of the media. Furthermore, media objects with higher visual interest are automatically identified based on the heat rankings, thereby alleviating the need for manual intervention by a user. Therefore, the present subject matter may provide economic, accurate, reliable, and time-effective positioning of content in a media.

FIG. 1 illustrates a schematic view of a system 100 for creation of heat maps for a media and heat ranking of media objects in the media based on the heat maps. Media objects with higher visual interest may be automatically identified based on the ranking of the media objects. The description hereinafter is explained with reference to placement of content in a media based on heat rankings of the media objects only for the purpose of explanation and should not be construed as a limitation. One of ordinary skill in the art will appreciate that performance of content in the media during and after the production process may also be evaluated based on the rankings of the media objects. In an example embodiment, the content may be indicative of one or more of a text, an image, and multimedia content.

The system 100 may include a heat map creation engine 102, a semantic segmentation engine 104, and a heat ranking engine 106. In an example embodiment, the heat map creation engine 102, the semantic segmentation engine 104, and the heat ranking engine 106 may be in communication with each other to perform the functionalities of the system 100. Furthermore, in an example embodiment, the system 100 may be communicatively coupled to a client device 108 through one or more communication links, such that a user of the client device 108 can access the system 100. In one example, the user may be an administrator of the client device 108. In another example, the user may be a person who is well versed in the art of media editing or marketing or graphic designing such as, for example, a marketer.

In an example embodiment, the heat map creation engine 102 of the system 100 may receive a series of image frames from amongst a plurality of image frames of a media. In an example, the series of image frames includes a target frame and at least one neighboring frame. A target frame may be understood as an image frame for which a heat map is to be created. Upon receiving the series of image frames, the heat map creation engine 102 may extract spatial-temporal features of the image frames. Furthermore, based on the spatial-temporal features of the image frames, the heat map creation engine 102 may create a heat map for the target frame.

In addition, the semantic segmentation engine 104 of the system 100 may segment the plurality of image frames of the media into multiple media objects based on pre-defined classes. Subsequently, the semantic segmentation engine 104 may select one or more media objects from amongst the media objects based on pre-defined conditions. Thereafter, the heat ranking engine 106 of the system 100 may detect image frames comprising the selected one or more media objects. In an example, the heat ranking engine 106 may detect the image frames comprising the selected one or more media objects based on camera angle changes.

Further, the heat ranking engine 106 may determine heat scores for the selected one or more media objects. In one example, the heat ranking engine 106 may determine a heat score for a media object based on a number of image frames comprising the selected one or more media objects, a total number of image frames in the media, heat data of the media object at pixel level, and one of a total number of pixels in the media object and a total number of pixels in the image frames comprising the selected one or more media objects. Thereafter, the heat ranking engine 106 may rank the selected one or more media objects in the media based on the heat scores and the created heat map. In an embodiment, the heat ranking engine 106 may provide information indicative of the ranks of the media objects to the client device 108 for placement of content in the media.

Figure 2:
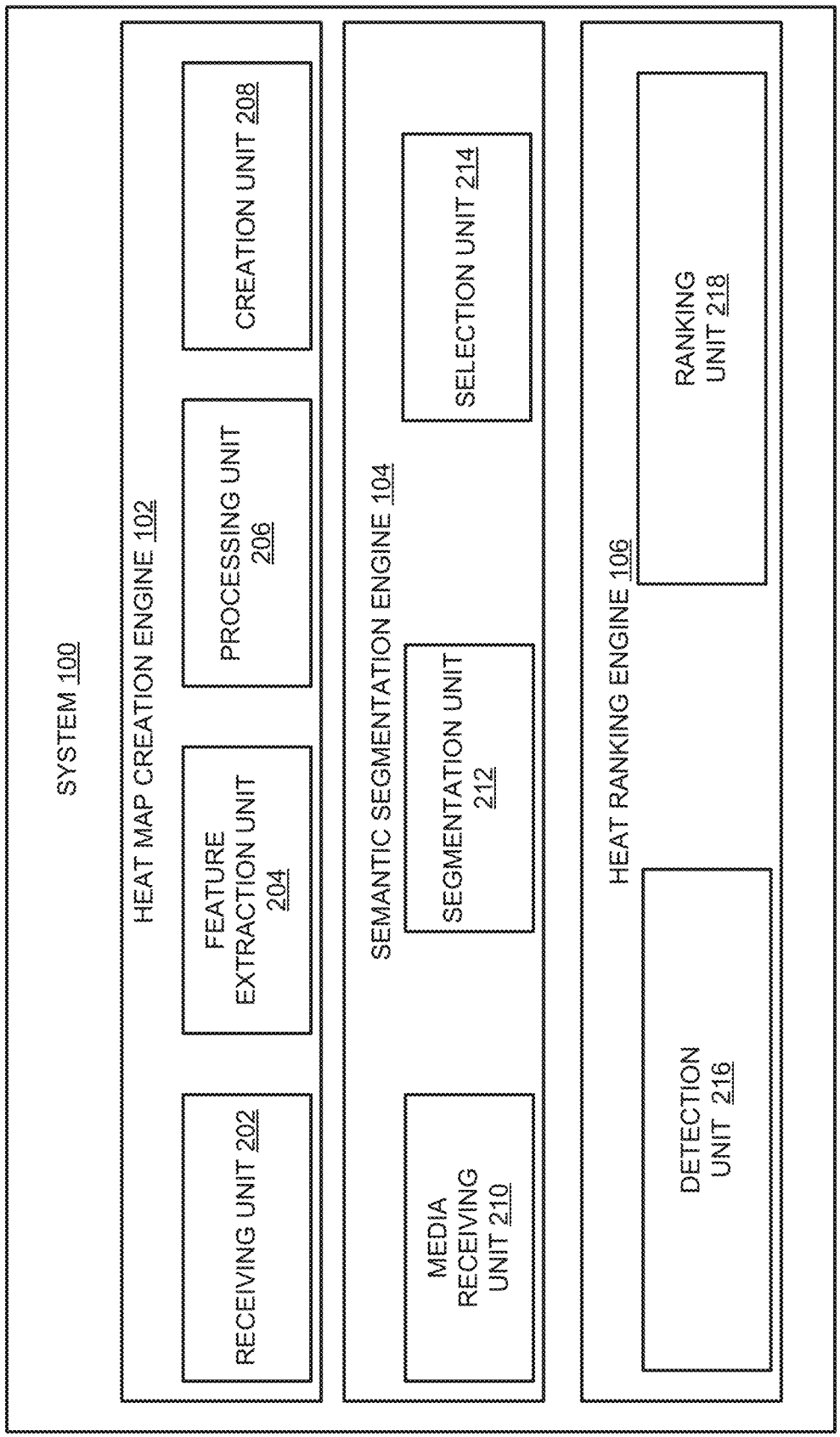
FIG. 2 illustrates another block diagram of the system, according to an example embodiment of the present disclosure.

The manner in which system 100 creates heat maps for the media and ranks media objects in the media based on the heat maps is further described in detail in conjunction with FIG. 2.

FIG. 2 illustrates another block diagram of the system 100, according to an example embodiment of the present disclosure.

As described above, the system 100 may include the heat map creation engine 102, the semantic segmentation engine 104, and the heat ranking engine 106. Further, in an example embodiment, the heat map creation engine 102 may include a receiving unit 202, a feature extraction unit 204, a processing unit, 206, and a creation unit 208. The semantic segmentation engine 104 may include a media receiving unit 210, a segmentation unit 212, and a selection unit 214. Also, the heat ranking engine 106 may include a detection unit 216 and a ranking unit 218.

In an example embodiment, the feature extraction unit 204 may be in communication with the receiving unit 202. The processing unit 206 may be in communication with the feature extraction unit 204. The creation unit 208 may be in communication with the processing unit 206. Further, the media receiving unit 210 may be in communication with the receiving unit 202, the feature extraction unit 204, and the processing unit 206. The segmentation unit 212 may be in communication with the media receiving unit 210 and the selection unit 214 may be in communication with the segmentation unit 212. In an example embodiment, the detection unit 216 may be in communication with the receiving unit 202, the feature extraction unit 204, the processing unit 206, the media receiving unit 210, and the segmentation unit 212, and the selection unit 214. Further, the ranking unit 218 may be in communication with the detection unit 216.

In an example embodiment, the receiving unit 202 of the heat map creation engine 102 may receive a series of image frames from amongst a plurality of image frames of a media. In an example, the media may be a video for which potential objects are to be detected for placing advertisement content. As described earlier, the content is indicative one or more of a text, an image, and multimedia content. For example, the content may be a logo of an advertiser. The series of image frames may include a target frame and at least one neighboring frame. In an example, the series of the image frames may include ten image frames, such that the series of image frames includes one target frame and nine neighboring frames. The target frame may be understood as an image frame for which a heat map is to be created. In an example embodiment, the receiving unit 202 may receive the series of image frames from a user of the client device 108. In an alternative example embodiment, the receiving unit 202 may receive the series of the image frames from a data repository (not shown), which may be an internal data repository or an external data repository.

Once the series of the image frames is received by the receiving unit 202, the feature extraction unit 204 of the heat map creation engine 102 may extract spatial-temporal features of the image frames. The spatial-temporal features of the image frames may include one or more spatial features of the each image frame and one or more temporal features of the image frames. In an example, the one or more spatial features of each image frame may include one or more of color features, texture features, shape features, and size features. Furthermore, the one or more temporal features of the image frames include one or more of motion features, trajectory features, and flicker features.

In addition, the processing unit 206 of the heat map creation engine 102 may remove normalization from the spatial-temporal features of the image frames to obtain the spatial-temporal features at a pixel level and rescale the spatial-temporal features to obtain a heat distribution over the target frame. Thereafter, the creation unit 208 of the heat map creation engine 102 may create a heat map for the target frame based on the heat distribution over the target frame. The heat map may highlight areas or regions in the media that may be of higher interest to viewers.

Accordingly, the heat map creation engine 102 extracts both spatial and temporal features of the image frames at the same and thus the heat map of the target frame could be created based on local information from the target frame and global information from multiple neighboring frames.

In an example embodiment, the heat map creation engine 102 may be a Spatio-Temporal Convolution Neural Network (CNN) model. The heat map creation engine 102 may be pre-trained based on a training dataset. The training dataset may include, but is not limited to, training image frames and spatial-temporal features of the training image frames.

Although it has been described that the the creation unit 208 creates a heat map for one target frame, i.e. an image frame, in alternative embodiments the creation unit 208 may create heat maps for all the image frames in the media in a similar manner as described above. The manner in which the heat map creation engine 102 creates a heat map for a media is further described in detail in conjunction with FIG. 3.

Once the heat map is created, the media receiving unit 210 of the semantic segmentation engine 104 may receive the media comprising the plurality of image frames. In an example, the media receiving unit 210 may receive the media from the heat map creation engine 102. In another example, the media receiving unit 210 may receive the media from the user of the client device 108.

Furthermore, the segmentation unit 212 of the semantic segmentation engine 104 may segment the image frames into multiple media objects based on pre-defined classes. In an example, the media objects may be understood as semantically meaningful parts of the media that could integrate with content to be placed in the media. In an example, the pre-defined classes may be defined based on content that is to be placed in the media or content whose performance is to be evaluated. Further, in an example embodiment, the pre-defined classes may include classes with high visual interest to viewers and classes with low visual interest to the viewers. According to an example, a media may include objects such as, for example, a wall, a building, a house, a window, a door, a painting, a bulletin board, a poster, a TV, a screen, a table, a bus, a car, an airplane, sky, a tree, grass, flowers, rocks, sand, mountains, hill, and a river. Then the wall, the building, the house, the window, the door, the painting, the bulletin board, the poster, the TV, the screen, the table, the bus, the car, and the airplane may be considered as classes with high visual interest. On the other hand, the sky, the tree, the grass, the flowers, the rocks, the sand, the mountains, the hill, and the river may be considered as classes with low visual interest. In this manner, the segmentation unit 212 may recognize each media object in each image frame of the media.

The selection unit 214 of the semantic segmentation engine 104 may select one or more media objects from amongst the media objects based on pre-defined conditions. In an example, the pre-defined conditions may be defined based on content that is to be placed in the media. An example of pre-defined conditions includes conditions related to object size and object shape. For example, if a media object is of a bigger size in comparison to another media object, then the selection unit 214 may select the bigger media object because it may be easier to insert content at or around the objects that are large enough for the content. In another example, if a media object is of triangular shape and another media object is of rectangular shape, then the selection unit 214 may select the media object having the rectangular shape and discard the media object having triangular shape because content could easily integrate into the rectangular shaped media object in comparison to the triangular shaped media object.

Once the one or more media objects have been selected from amongst the media objects, the detection unit 216 of the heat ranking engine 106 may detect image frames comprising the selected one or more media objects. This is because the selected one or more media objects might be in different image frames. In an example, the detection unit 216 may detect the image frames comprising the selected one or more media objects based on camera angle changes in the media. In an example, the image frames comprising the selected one or more media objects are identified as shots, such that a media object in one shot could be recognised based on visual interest to be the same media object in another shot, thus allowing content insertion in the media in a manner that would appear seamless to the viewer.

Thereafter, the ranking unit 218 of the heat ranking engine 106 may determine heat scores for the selected one or more media objects. In an example embodiment, the ranking unit 218 may determine a heat score for a media object based on a number of image frames comprising the selected one or more media objects, a total number of image frames in the media, heat data of the media object at pixel level, and a total number of pixels in the media object. In an example, a heat score of a media object is determined based on equation (1) provided below.

$$HS_i = \frac{\sum FR_i \frac{\sum PI_i}{AR_i}}{\sum TFR} \quad (1)$$

where $Hs_{i_a}$ represents a heat score of $i^{th}$ object, $FR_i$ represents image frames comprising $i^{th}$ object, $AR_i$ represents a total number of pixels in the $i^{th}$ object, $PI_i$ represents heat data of the $i^{th}$ object at pixel level, and TFR represents total image frames in the media.

In another example embodiment, the ranking unit 218 may determine a heat score for a media object based on a number of image frames comprising the selected one or more media objects, a total number of image frames in the media, heat data of the media object at pixel level, and a total number of pixels in the image frames comprising the selected one or more media objects. In another example embodiment, a heat score of a media object is determined based on equation (2) provided below.

$$HS_i = \frac{\sum FR_i \frac{\sum PI_i}{PI\_FR}}{\sum TFR} \quad (2)$$

where $HS_i$ represents a heat score of $i^{th}$ object, $FR_i$ represents image frames comprising the $i^{th}$ object, $PI\_FR$ represents a total number of pixels per image frame comprising the $i^{th}$ object, $PI_i$ represents heat data of the $i^{th}$ object at pixel level, and TFR represents total image frames in the media.

In an example, the selection of equation to determine the heat scores is based on the content that is to be placed in the media. Specifically, when the heat score of the media object is determined based on equation (1), then completeness of a highly visible object is attained. Further, when the heat score of the media object is determined based on equation (2), visibility of the media object is reflected in overall image frames. Accordingly, the heat scores of the media object not only reflect visual attention at frame level, but also take attention duration and surface area into account.

Upon determination of the heat scores for the media objects, the ranking unit 218 may rank the selected one or more media objects in the media based on the heat scores and the created heat map. In an example embodiment, the ranking unit 218 may rank each selected media object based on the heat score of the media object and heat maps created for the image frames in the video. In an example, a media object with a highest rank is an object of maximum visual interest to a viewer and a media object with a lowest rank is an object with minimum visual interest to the viewer.

According to an example implementation, the ranking unit 218 of the heat ranking engine 106 may provide information indicative of the ranks (also referred to as heat ranks) of the media objects to the user of the client device 108 for placement of content in the media. The content may be indicative of one or more of a text, an image, and multimedia content.

In the present disclosure, because media objects with higher visual interest are automatically identified by the heat ranking engine 106 based on the heat rankings, there is no need for a user to manually identify the media objects with higher visual interest. This is because the user would already know where to place the content in the media. Thus, automatic identification of the media objects with higher visual interest may reduce time and effort required by the user. Additionally, because the heat map is created based on spatial features (local information) from the target frame and global information (temporal features) from multiple neighboring frames, a highly accurate heat map may be created. Thus, the process of creation of heat maps for a media and heat ranking of media objects in the media based on created heat maps may be performed by the system in a reliable, accurate, and robust manner.

Figure 3:
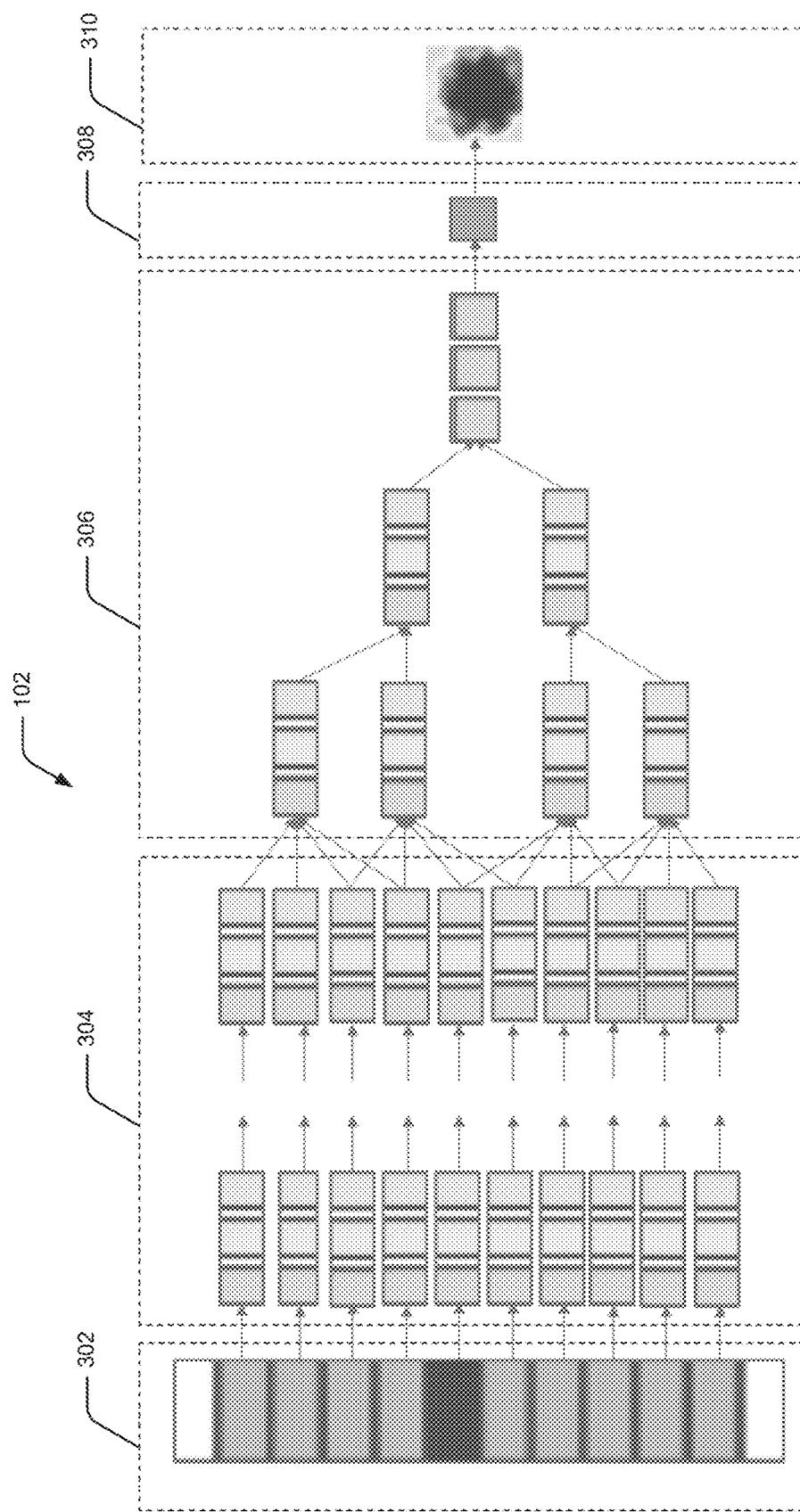
FIG. 3 illustrates a heat map creation engine for creation of a heat map for an image frame, according to an example embodiment of the present disclosure.

FIG. 3 illustrates a heat map creation engine process 102 for creation of a heat map for an image frame, according to an example embodiment of the present disclosure. In an example embodiment, the heat map creation engine 102 may be a Spatio-Temporal Convolution Neural Network (CNN) model. The heat map creation engine 102 may include multiple blocks of layers. In an example, the layers may include convolutional, normalization, and pooling layers.

At step 302, a series of image frames is provided to heat map creation engine 102. As shown in FIG. 3, a series of ten image frames is provided to heat map creation engine 102. Therefore, to create a heat map for a single image a frame, a series of multiple frames is used. The series of image frames includes one target frame (represented by dark gray block) and nine neighboring frames (represented by light gray color blocks). Four neighboring frames are placed ahead of the target frames and five neighboring frames are placed below the target frames.

At step 304, each of the ten image frames are then fed into multiple blocks of convolutional, normalization and pooling layers for extraction of spatial features of each image frame. In an example, the spatial features, such as a color features and texture features may be extracted for each frame.

At step 306, temporal features of the image frames are extracted. The result that is achieved from step 304 is used at step 306. In an example, the first convolutional layer is applied with filters of temporal extent T=4 and stride S=2. As shown in FIG. 3, four responses in time are thus produced. Further, the second and third layers perform the similar process with filters of temporal extent T=2 and stride S=2. In this way, the final layer could extract temporal features of all the ten image frames. In an example, temporal features of the image frames may include motion features, trajectory features, flicker features, and the like.

At step 308, the spatial and temporal features of the image frames are rescaled to obtain a heat distribution over the target frame. In an example, the spatial and temporal features of the image frames are rescaled using a softmax function.

At step 310, a heat map is created for the target frame based on the heat distribution over the target frame. Thus the heat map creation engine 102 extracts both spatial and temporal features of the image frames at the same time, and creates the heat map of the target frame based on local information from the target frame and global information from multiple neighboring frames.

Figure 4:
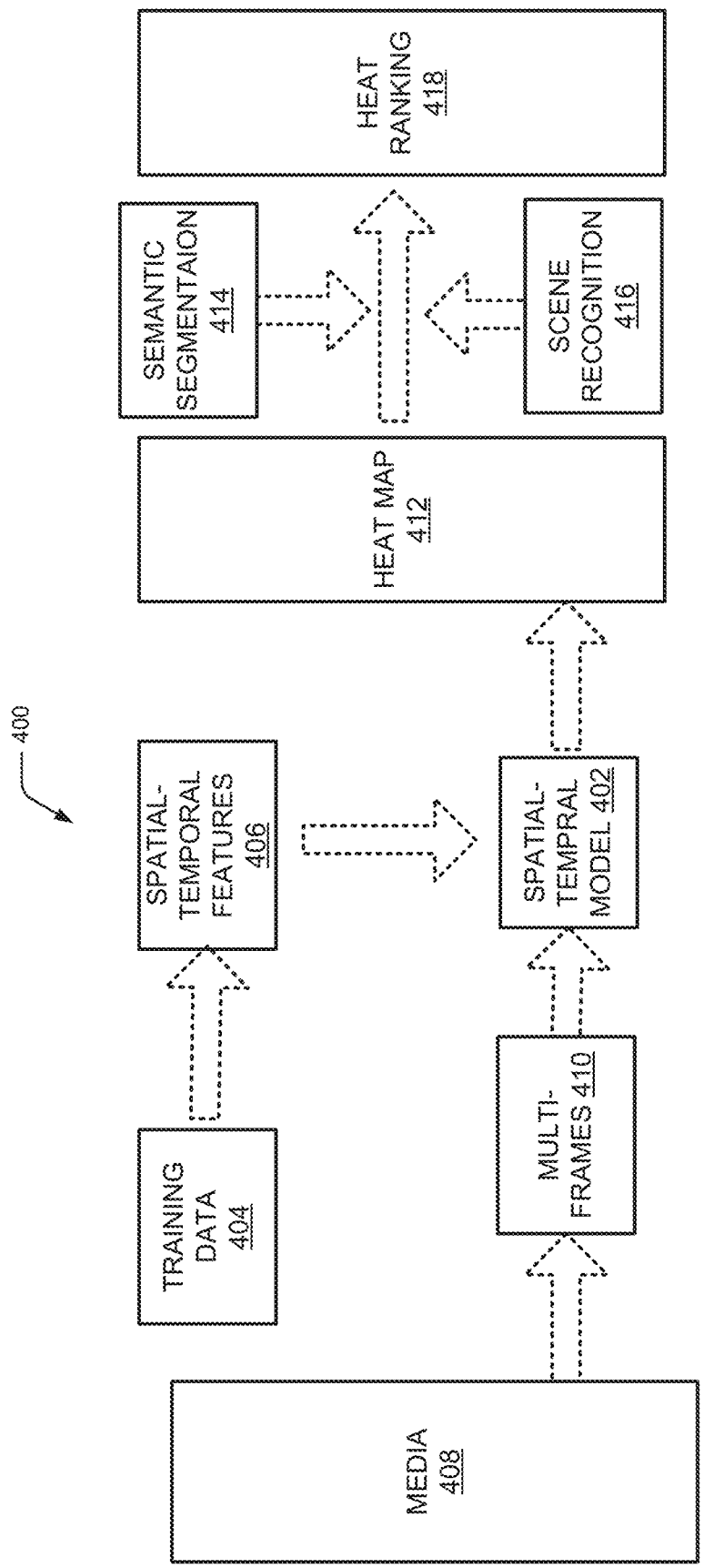
FIG. 4 illustrates a process for ranking of media objects in a media based on the heat map, according to an example embodiment of the present disclosure.

FIG. 4 illustrates a process 400 for ranking of media objects in a media based on the heat map, according to an example embodiment of the present disclosure.

As shown in FIG. 4, a spatio-temporal model 402 is initially trained over a training data 404. The training data 404 may include spatial-temporal features 406 of training image frames. Thereafter, media 408 comprising multi-frames 410 may be fed into the spatio-temporal model 402. The multi-frames 410 may include a target frame and multiple neighboring frames. Subsequently, the spatio-temporal model 402 extracts spatial-temporal features of the multi-frames 410 and creates a heat map 412 for the target frame based on the spatial-temporal features. Furthermore, semantic segmentation 414 is performed on the media 408 to segment the media 408 into multiple media objects. In an example embodiment, the semantic segmentation 414 may be performed on the media 408 based on pre-defined classes. In particular, semantic segmentation 414 may be performed to select one or more media objects from amongst the media objects based on pre-defined conditions. Thereafter, scene recognition 416 is performed to detect image frames comprising the selected one or more media objects based on camera angle changes. The scene recognition 416 may further be performed to determine heat scores for the selected one or more media objects. Finally, heat ranking 418 is performed to rank the selected one or more media objects in the media 408 based on the heat scores and the created heat map 412. In an example embodiment, creation of the heat map 412 and heat ranking 418 of the media objects based on the heat map 412 is performed in real-time; however, the training of the spatio-temporal model 402 may or may not be performed in real-time.

Figure 5:
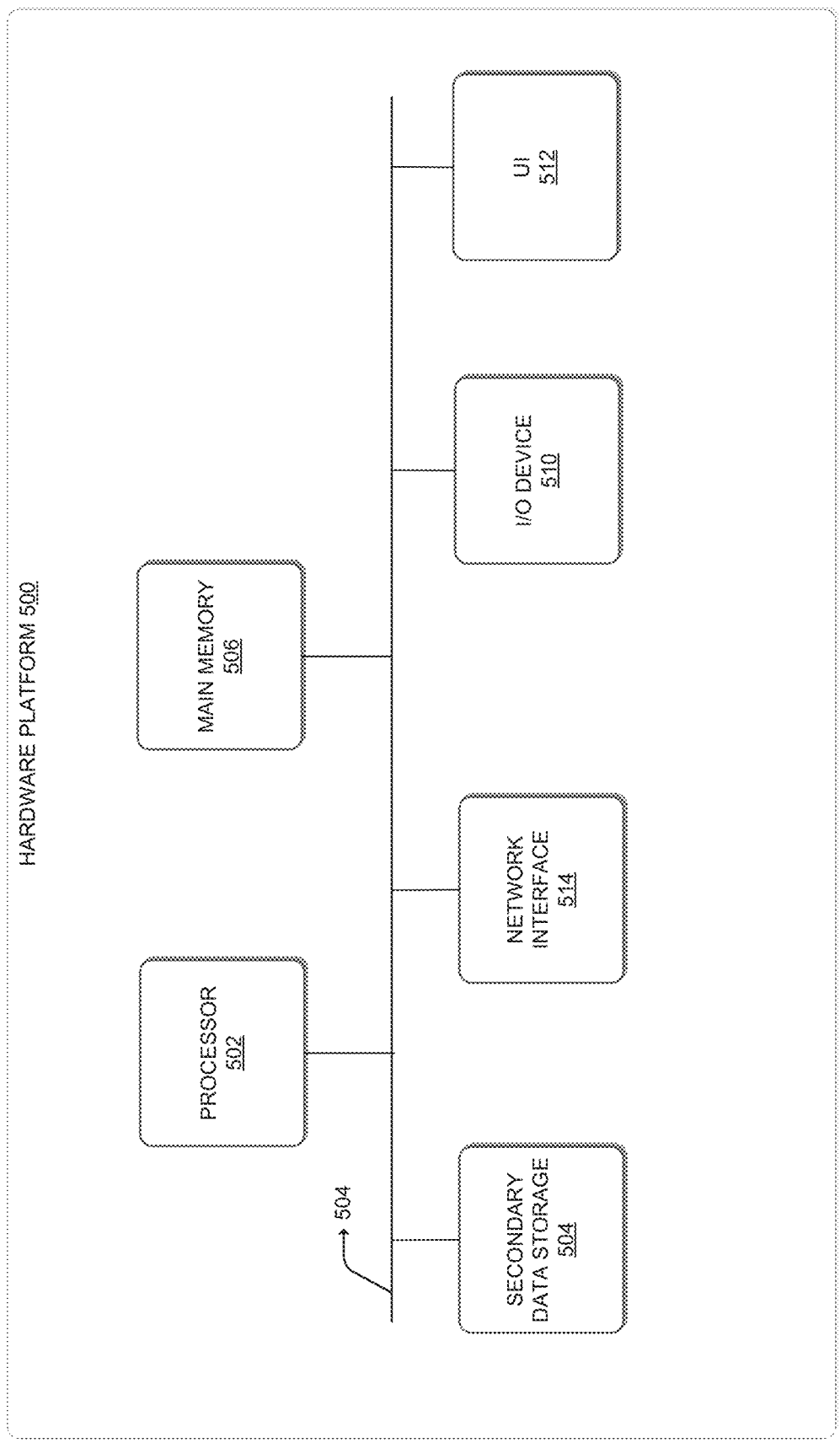
FIG. 5 illustrates a hardware platform for implementation of the system, according to an example of the present disclosure.

FIG. 5 illustrates a hardware platform 500 for implementation of the system 100, according to an example of the present disclosure. In an example embodiment, the hardware platform 500 may be a computer system 500 that may be used with the examples described herein. The computer system 500 may represent a computational platform that includes components that may be in a server or another computer system. The computer system 500 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 500 may include a processor 502 that may implement or execute machine readable instructions performing some or all of the methods, functions, techniques and/or other processes described herein. Commands and data from the processor 502 may be communicated over a communication bus 504. The computer system 500 may also include a main memory 506, such as a random access memory (RAM), where the machine readable instructions and data for the processor 502 may reside during runtime, and a secondary data storage 508, which may be non-volatile and stores machine readable instructions and data. The memory 506 and data storage 508 are examples of non-transitory computer readable mediums. The memory 506 and/or the secondary data storage may store data used by the system 100, such as an object repository including web objects, configuration data, test data, etc.

The computer system 500 may include an Input/Output (I/O) device 510, such as a keyboard, a mouse, a display, etc. A user interface (UI) 512 can be a communication device that provides textual and graphical user interfaces to a user of the system 100. The UI 512 may operate with I/O device 510 to accept from and provide data to a user. The computer system 500 may include a network interface 514 for connecting to a network. Other known electronic components may be added or substituted in the computer system. The processor 502 may be designated as a hardware processor. The processor 502 may execute various components of the system 100 described above and perform the methods described below.

FIG. 6 illustrates a computer-implemented method 600 depicting functionality of the system 100, according to an example of the present disclosure. For the sake of brevity, construction and operational features of the system 100 which are explained in detail in the description of FIG. 1, FIG. 2, FIG. 3, FIG. 4, and FIG. 5 are not explained in detail in the description of FIG. 6.

At method block 602, the method 600 commences with receiving a series of image frames from amongst a plurality of image frames of a media. The series of image frames includes a target frame and at least one neighboring frame.

At method block 604, spatial-temporal features of the image frames are extracted. The spatial-temporal features of the image frames may include one or more spatial features and one or more temporal features of the image frames. In an example, the one or more spatial features of the image frames may include one or more of color features, texture features, shape features, and size features, and the one or more temporal features of the image frames may include one or more of motion features, trajectory features, and flicker features.

At method block 606, the spatial-temporal features of the image frames are rescaled to obtain a heat distribution over the target frame.

At method block 608, a heat map is created for the target frame based on the heat distribution over the target frame.

At method block 610, the image frames of the media comprising the plurality of image frames are segmented into multiple media objects based on pre-defined classes.

At method block 612, one or more media objects are selected from amongst the media objects based on pre-defined conditions.

At method block 614, image frames comprising the selected one or more media objects are detected. In an example, the image frames comprising the selected one or more media objects may be detected based on camera angle changes. In an example, the image frames comprising the selected one or more media objects are identified as shots, such that a media object in one shot could be recognised based on visual interest to be the same media object in another shot, thus allowing content insertion in the media in a manner that would appear seamless to the viewer.

At method block 616, heat scores for the selected one or more media objects are determined. In an example embodiment, a heat score for a media object may be determined based on a number of image frames comprising the selected one or more media objects, a total number of image frames in the media, heat data of the media object at pixel level, and a total number of pixels in the media object.

In another example embodiment, the heat score for the media object may be determined based on a number of image frames comprising the selected one or more media objects, a total number of image frames in the media, heat data of the media object at pixel level, and a total number of pixels in the image frames comprising the selected one or more media objects.

At method block 618, the selected one or more media objects in the media are ranked based on the heat scores and the created heat map.

Furthermore, information indicative of the ranks of the media objects may be provided to a client device for placement of content in the media. The content may be indicative of one or more of a text, an image, and multimedia content.

What has been described and illustrated herein are examples of the present disclosure. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A system comprising:
   a heat map creation engine to:
      receive a series of image frames from amongst a plurality of image frames of a media, wherein the series of image frames includes a target frame and at least one neighboring frame;
      extract spatial-temporal features of the image frames;
      remove normalization from the spatial-temporal features to obtain the spatial-temporal features at a pixel level;
      upon removing the normalization, rescale the spatial-temporal features to obtain a heat distribution over the target frame; and
      create a heat map for the target frame based on the heat distribution over the target frame;
   a semantic segmentation engine, in communication with the heat map creation engine, the semantic segmentation engine to:
      receive the media comprising the plurality of image frames;
      segment the image frames into multiple media objects based on pre-defined classes;
      select one or more media objects from amongst the media objects based on an area and a shape of the one or more media objects; and
   a heat ranking engine, in communication with the semantic segmentation engine, the heat ranking engine to:
      detect image frames comprising the selected one or more media objects based on camera angle changes;
      determine heat scores for the selected one or more media objects, wherein a heat score for a media object is determined based on a number of image frames comprising the selected one or more media objects, a total number of image frames in the media, heat data of the media object at pixel level, and one of a total number of pixels in the media object and a total number of pixels in the image frames comprising the selected one or more media objects; and
      rank the selected one or more media objects in the media based on the heat scores and the created heat map.

2. The system of claim 1, wherein a media object with a highest rank is an object of maximum visual interest to a viewer and a media object with a lowest rank is an object with minimum visual interest to the viewer.

3. The system of claim 1, wherein the system is further connected to a client device to provide information indicative of the ranks of the media objects for placement of content in the media, wherein the content is indicative of one or more of a text, an image, and multimedia content.

4. The system of claim 1, wherein the spatial-temporal features of the image frames include one or more spatial features of the image frames and one or more temporal features of the image frames.

5. The system of claim 4, wherein the one or more spatial features of the image frames include one or more of color features, texture features, shape features, and size features.

6. The system of claim 4, wherein the one or more temporal features of the image frames include one or more of motion features, trajectory features, and flicker features.

7. The system of claim 1, wherein the heat map creation engine is a Spatio-Temporal Convolution Neural Network (CNN) model.

8. The system of claim 7, wherein the heat map creation engine is pre-trained based on a training dataset.

9. The system of claim 7, wherein the feature extraction unit comprises multiple blocks of feature extraction layers to extract the spatial-temporal features of the image frames.

10. A system comprising:
a heat map creation engine to:
  receive a series of image frames from amongst a plurality of image frames of a media, wherein the series of image frames includes a target frame and at least one neighboring frame;
  extract spatial-temporal features of the image frames;
  remove normalization from the spatial-temporal features to obtain the spatial-temporal features at a pixel level;
  upon removing the normalization, rescale the spatial-temporal features to obtain a heat distribution over the target frame;
  create a heat map for the target frame based on the heat distribution over the target frame;
a semantic segmentation engine, in communication with the heat map creation engine, the semantic segmentation engine to:
  receive the media comprising the plurality of image frames;
  segment the image frames into multiple media objects based on pre-defined classes;
  select one or more media objects from amongst the media objects based on an area and a shape of the one or more media objects; and
a heat ranking engine, in communication with the semantic segmentation engine, the heat ranking engine:
  determine heat scores for the selected one or more media objects, wherein a heat score for a media object is determined based on one of a total number of pixels in the media object and a total number of pixels in the image frames comprising the selected one or more media objects; and
  rank the selected one or more media objects in the media based on the heat scores and the created heat map.

11. The system of claim 10, wherein the heat ranking engine is further to detect image frames comprising the selected one or more media objects based on camera angle changes.

12. The system of claim 10, wherein the ranking unit determines the heat score for the media object based on a number of image frames comprising the selected one or more media objects, heat data of the media object at pixel level, a total number of image frames in the media, and the total number of pixels in the media object.

13. The system of claim 10, wherein the ranking unit determines the heat score for the media object based on a number of image frames comprising the selected one or more media objects, a total number of image frames in the media, heat data of the media object at pixel level, and a total number of pixels in the image frames comprising the selected one or more media objects.

14. The system of claim 10, wherein a media object with a highest rank is an object of maximum visual interest to a viewer and a media object with a lowest rank is an object with minimum visual interest to the viewer.

15. A computer-implemented method, executed by at least one processor, the method comprising:
  receiving a series of image frames from amongst a plurality of image frames of a media, wherein the series of image frames includes a target frame and at least one neighboring frame;
  extracting spatial-temporal features of the image frames;
  removing normalization from the spatial-temporal features to obtain the spatial-temporal features at a pixel level;
  upon removing the normalization, rescaling the spatial-temporal features to obtain a heat distribution over the target frame;
  creating a heat map for the target frame based on the heat distribution over the target frame;
  segmenting the image frames of the media comprising the plurality of image frames into multiple media objects based on pre-defined classes;
  selecting one or more media objects from amongst the media objects based on an area and a shape of the one or more media objects;
  detecting image frames comprising the selected one or more media objects based on camera angle changes;
  determining heat scores for the selected one or more media objects, wherein a heat score for a media object is determined based on a number of image frames comprising the selected one or more media objects, a total number of image frames in the media, heat data of the media object at pixel level, and one of a total number of pixels in the media object and a total number of pixels in the image frames comprising the selected one or more media objects; and
  ranking the selected one or more media objects in the media based on the heat scores and the created heat map.

16. The computer-implemented method of claim 15, wherein the spatial-temporal features of the image frames include one or more spatial features of the image frames and one or more temporal features of the image frames.

17. The computer-implemented method of claim 15, wherein the one or more spatial features of the image frames include one or more of color features, texture features, shape features, and size features.

18. The computer-implemented method of claim 15, wherein the one or more temporal features of the image frames include one or more of motion features, trajectory features, and flicker features.

19. The computer-implemented method of claim 15, wherein the method further comprising providing information indicative of the ranks of the media objects to a client device for placement of content in the media, wherein the content is indicative of one or more of a text, an image, and multimedia content.

* * * * *

UNITED STATES PATENT AND TRADEMARK OFFICE
CERTIFICATE OF CORRECTION

PATENT NO. : 10,785,509 B2  
APPLICATION NO. : 15/962646  
DATED : September 22, 2020  
INVENTOR(S) : Christian Souche et al.

Page 1 of 1

It is certified that error appears in the above-identified patent and that said Letters Patent is hereby corrected as shown below:

On the Title Page

Item [30], insert:  
--Apr. 25, 2017 (EP) ................. 17 168066.3  
Apr. 25, 2017 (EP) ................. 17 168069.7  
Jun. 14, 2017 (EP) ................. 17 176137.2--

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*